(12) United States Patent
Halldorf et al.

(10) Patent No.: US 11,015,508 B2
(45) Date of Patent: May 25, 2021

(54) EXHAUST ADDITIVE DOSING SYSTEM COMPRISING AN EXHAUST ADDITIVE DISTRIBUTION DEVICE AND AN EXHAUST ADDITIVE METERING DEVICE

(71) Applicant: Scania CV AB, Södertälje (SE)

(72) Inventors: Erik Halldorf, Mariefred (SE); Per-Erik Nilsson, Nykvarn (SE); Anders Gawell, Stjärnhov (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/344,181

(22) PCT Filed: Jun. 13, 2017

(86) PCT No.: PCT/SE2017/050628
§ 371 (c)(1),
(2) Date: Apr. 23, 2019

(87) PCT Pub. No.: WO2018/080371
PCT Pub. Date: May 3, 2018

(65) Prior Publication Data
US 2019/0316509 A1    Oct. 17, 2019

(30) Foreign Application Priority Data

Oct. 26, 2016    (SE) ...................................... 1651396

(51) Int. Cl.
*F01N 3/28* (2006.01)
*B01D 53/94* (2006.01)
(Continued)

(52) U.S. Cl.
CPC ....... *F01N 3/2892* (2013.01); *B01D 53/9431* (2013.01); *B01F 3/04028* (2013.01);
(Continued)

(58) Field of Classification Search
CPC . F01N 3/28; F01N 3/2892; F01N 3/20; F01N 3/2066; F01N 3/208;
(Continued)

(56) References Cited

U.S. PATENT DOCUMENTS 5,116,579 A * 5/1992 Kobayashi ......... B01D 53/9409
422/111
6,202,413 B1 * 3/2001 Baker ....................... F01N 5/04
415/145
(Continued)

FOREIGN PATENT DOCUMENTS

CN       103633780 A      3/2014
DE    102008043726 A1    5/2009
(Continued)

OTHER PUBLICATIONS

Scania CV AB, International Application No. PCT/SE2017/050628, International Preliminary Report on Patentability, dated Apr. 30, 2019.

(Continued)

*Primary Examiner* — Jesse S Bogue
*Assistant Examiner* — Loren C Edwards
(74) *Attorney, Agent, or Firm* — Moore & Van Allen PLLC; W. Kevin Ransom

(57) ABSTRACT

Disclosed is a dosing system for a turbocharger turbine of an exhaust system for an internal combustion engine, the dosing system comprising a distribution device and a metering device. The distribution device comprises a receiving surface, and at least one distribution surface. The receiving surface is equipped to receive exhaust additive dosed to the distribution device. The distribution surface is in fluid communication with the receiving surface and is equipped to distribute exhaust additive in an exhaust stream passing through the turbocharger turbine by a rotary motion of the (Continued)

distribution device. The distribution device is attached to a shaft or hub of the turbocharger turbine. The metering device comprises a supply channel, a metering valve, and a dosing pipe arranged downstream of the metering valve in the direction of flow of reductant when dosing. The metering device is arranged to supply exhaust additive to the receiving surface of the distribution device.

19 Claims, 5 Drawing Sheets

(51) Int. Cl.
*B01F 3/04* (2006.01)
*B01F 5/04* (2006.01)
*F01D 5/02* (2006.01)
*F01N 3/20* (2006.01)
*F02B 37/18* (2006.01)
*F02B 39/00* (2006.01)

(52) U.S. Cl.
CPC ........ *B01F 3/04049* (2013.01); *B01F 5/0451* (2013.01); *F01D 5/02* (2013.01); *F01N 3/208* (2013.01); *F02B 37/18* (2013.01); *F02B 39/00* (2013.01); *F01N 2610/02* (2013.01); *F01N 2610/1453* (2013.01); *F05D 2220/40* (2013.01); *F05D 2240/241* (2013.01)

(58) Field of Classification Search
CPC ......... F01N 2610/02; F01N 2610/1453; B01D 53/90; B01D 53/9431; B01F 3/04028; B01F 3/04049; B01F 5/0451; F01D 5/02; F05D 2220/40; F05D 2240/241; Y02T 10/144
See application file for complete search history.

(56) References Cited

U.S. PATENT DOCUMENTS 8,978,361 B2   3/2015   Brück et al.
2003/0230072 A1   12/2003   Megas et al.
2009/0249786 A1*   10/2009   Garrett ...................... F01D 1/06
                                                                        60/612
2010/0319342 A1*   12/2010   Brown .................... F01N 3/035
                                                                        60/598
2014/0056721 A1   2/2014   Garrard et al.
2014/0056726 A1*   2/2014   Garrard .................... H02K 9/19
                                                                        417/228

FOREIGN PATENT DOCUMENTS

| EP | 1420873 A1 | 5/2004 |
| EP | 1992798 A1 | 11/2008 |
| JP | 2006307734 A | 11/2006 |
| JP | 2008128046 A | 6/2008 |
| JP | 2008215097 A | 9/2008 |
| JP | 2009114934 A1 | 5/2009 |
| JP | 2014134157 A | 7/2014 |
| RU | 2496994 C2 | 10/2013 |
| WO | 03018177 A1 | 3/2003 |

OTHER PUBLICATIONS

Scania CV AB, International Patent Application No. PCT/SE2017/050628, International Search Report, dated Sep. 1, 2017.
Scania CV AB, International Patent Application No. PCT/SE2017/050628, Written Opinion, dated Sep. 1, 2017.
Scania CV AB, Swedish Patent Application No. 1651396-2, Office Action, dated Mar. 31, 2017.
Scania CV AB, Swedish Patent Application No. 1651396-2, Office Action, dated Nov. 14, 2018.
Scania CV AB, Chinese Application No. 201780080165.6, First Office Action, dated Sep. 1, 2020.
Scania CV AB, Russian Application No. 2019115111, Official Action, dated Sep. 22, 2020.
Scania CV AB, Chinese Patent Application No. 201780080165.6, Second Office Action, dated Feb. 19, 2021.

* cited by examiner

EXHAUST ADDITIVE DOSING SYSTEM COMPRISING AN EXHAUST ADDITIVE DISTRIBUTION DEVICE AND AN EXHAUST ADDITIVE METERING DEVICE

CROSS-REFERENCE TO RELATED APPLICATIONS

This application is a national stage application (filed under 35 § U.S.C. 371) of PCT/SE2017/050628, filed Jun. 13, 2017 of the same title, which, in turn, claims priority to Swedish Application No. 1651396-2 filed Oct. 26, 2016; the contents of each of which are hereby incorporated by reference.

FIELD OF THE INVENTION

The present invention relates to an exhaust additive distribution device for a turbocharger turbine of an exhaust system for an internal combustion engine. The present invention also relates to an exhaust additive metering device for metering an exhaust additive to the exhaust additive distribution device. The present invention further relates to an exhaust additive dosing system comprising the exhaust additive distribution device and the exhaust additive metering device.

BACKGROUND OF THE INVENTION

Emissions standards for motor vehicles are becoming increasingly stringent. Such standards typically specify maximum emission levels for a number of tailpipe pollutants including carbon monoxide (CO), hydrocarbons (HC), nitrogen oxides ($NO_x$) and particulate matter (PM). In order to meet the requirements of the present and presumably future standards, vehicles are required to be equipped with emissions reduction technologies. Such emissions reduction technologies suitable for diesel vehicles include exhaust gas recirculation (EGR), particulate filters, diesel oxidation catalysts (DOC), and selective catalytic reduction (SCR). Each technology has its own distinct advantages and disadvantages, and may increase the incidence of one pollutant while reducing the incidence of another. For example, EGR may reduce $NO_x$ emissions, but reduce fuel efficiency and increase particulate matter. Therefore, a number of technologies are commonly applied together in order to meet emissions standards.

Selective catalytic reduction (SCR) is an effective technology to reduce tailpipe nitrogen oxides ($NO_x$) emissions. It involves adding a reductant, such as ammonia, to the vehicle exhaust stream. The reductant, with the aid of a catalyst, reduces $NO_x$ in the exhaust stream to nitrogen gas ($N_2$) and water. In practical implementations in motor vehicles, an aqueous urea solution is used as a reductant and this urea solution is decomposed to ammonia and carbon dioxide in the hot exhaust stream.

Since SCR is implemented downstream of the engine as an exhaust aftertreatment, it does not affect the combustion performance of the engine in the same manner as for example EGR does. Therefore, it is desirable to be able to remove substantially all $NO_x$ from the exhaust stream using only SCR, without the need for EGR. However, this is not without difficulties. In order to produce the quantities of ammonia required to reduce substantially all $NO_x$, large quantities of urea solution must be injected into the exhaust stream. If the exhaust stream is sufficiently hot, the solution will evaporate and decompose to ammonia. The exact temperature that this occurs at depends on the injected mass flow of urea: the greater the mass flow, the higher the temperature required. At sub-optimal temperatures the urea solution may instead form deposits on surfaces of the exhaust conduit. Such deposits may include crystallized urea, as well as urea decomposition byproducts such as cyanuric acid. These deposits can be removed by heating the exhaust system at temperatures approaching 400° C., but such temperatures are rarely achieved during normal operation of the vehicle and therefore, special procedures must be adopted to remove the exhaust deposits.

A further difficulty with SCR is the requirement for efficient mixing in order to achieve uniform distribution of reductant over the entire surface area of multiple SCR catalyst substrates. The space available for mixing is extremely limited and the reductant is commonly injected into the exhaust stream shortly upstream of the SCR catalyst substrates. In order to improve mixing a mixing device, often resembling a turbine blade, is arranged in the exhaust pipe. However, even when using a mixing device, it is difficult to achieve sufficiently uniform mixing. Moreover, the presence of a mixing device in the exhaust pipe acts as an obstruction to flow, causing higher pressure upstream of the mixer (backpressure) and reducing the engine efficiency.

These problems may be addressed by providing injection of the reductant further upstream in the exhaust system, for example in conjunction with a turbocharger turbine arranged in the exhaust system.

A number of attempts have been made to utilize the turbocharger turbine for addition of additives to the exhaust stream.

EP 1992798 A1 describes a system for introducing hydrocarbons into the bearing housing for a turbocharger adjacent the turbine wheel shaft. A passage supplies fuel to an outlet located between a shaft seal for the turbine shaft and the hub of the turbocharger turbine. Fuel that passes from the outlet between the seal and the hub passes up the back face of the hub, is heated and vaporized and passes into the air flow generated by the turbine blades, where it is thoroughly mixed with the exhaust flow.

US 2003/0230072 describes an exhaust arrangement for an internal combustion engine wherein a urea injector is located in a turbocharger turbine housing for injecting urea into the turbine housing. The injector is configured to minimize contact of the injected urea with the through-hole through which the turbine rotational shaft passes.

There remains a need for an improved means of adding a reductant to an exhaust stream.

SUMMARY OF THE INVENTION

The inventors of the present invention have identified a number of shortcomings with regard to prior art solutions for providing a reductant to an exhaust stream. Some solutions necessitate a significantly re-engineered turbocharger having additional passages for transport of the additive. Such solutions are costly to develop and implement, and risk contamination of the turbine bearings and engine lubricant system with the additive being supplied to the exhaust. Other solutions require placement of injectors within the turbine housing. The temperature within the turbine housing is extremely high, and such high temperatures that the injectors are exposed to may cause material failure. Therefore, extensive cooling measures must be taken to ensure that the reductant solution in the injector is not prematurely exposed to high temperatures, which otherwise might lead to degradation and deposits forming in the injector nozzle. Further-more, the exhaust stream leaving the turbine is high velocity and highly turbulent, meaning that any attempts to precisely direct an injection stream to avoid impingement on turbine components will be extremely difficult, especially if the direction of injection is counter to the direction of exhaust flow, and will require extremely high injection pressures.

It is therefore an object of the present invention to provide an improved means of adding a reductant to an exhaust stream of an exhaust system having a turbocharger turbine. Another object of the present invention is to provide a means of adding a reductant that is simpler, more robust and less prone to contaminating turbine bearings and lubricant systems.

These objects are achieved by an exhaust additive distribution device for a turbocharger turbine of an exhaust system for an internal combustion engine, according to the appended claims. The exhaust additive distribution device comprises a fastening surface, a receiving surface, and at least one distribution surface(s); wherein the fastening surface is arranged at a first end of the exhaust additive distribution device and is equipped to fixedly attach the exhaust additive distribution device to a shaft or hub of the turbocharger turbine; wherein the receiving surface is arranged at a second end of the exhaust additive distribution device opposite the first end and is equipped to receive exhaust additive dosed to the exhaust additive distribution device; and wherein the distribution surface is arranged in fluid communication with the receiving surface and is equipped to distribute exhaust additive in an exhaust stream passing through the turbocharger turbine by the rotary motion of the exhaust additive distribution device.

This distribution device is used together with a metering device described below in order to dose exhaust additive, such as a reductant, into the exhaust stream. The distribution device is mounted on the shaft or hub of the turbocharger turbine and spins in unison with the turbine. The combination of a distribution device and metering device is constructionally simple, robust, and easily implemented with little custom adjustment to third party turbochargers from original equipment manufacturers.

Since the distribution device sits in the wake created by the turbine, exhaust additive is easily dosed to the distribution device without needing to overcome the high exhaust flow velocities present closer to the outlet walls of the turbine. Exhaust additive dosed to the distribution device is dispersed in the exhaust steam utilizing the centrifugal force of the spinning turbine. Thus, no energy need be expended to disperse the additive using an injector, as in prior art solutions. Due to the large amounts of kinetic energy supplied to the dosed exhaust additive, the high temperatures at the turbine outlet, and the highly turbulent flow at the turbine outlet, highly effective evaporation and mixing of the exhaust additive is obtained, meaning that a separate mixing device downstream of the additive dosing site may be avoided. Because the exhaust additive is dosed in the wake of the turbine and the metering device can be arranged in close proximity to the distribution device, the risk of exhaust additive impinging on turbine components such as the rotor blades or bearings is much reduced.

The receiving surface and distribution surface may together form a patterned facial surface at the second end of the exhaust additive distribution device. This patterned surface may be used to control and optimize the distribution of exhaust additive in the exhaust stream.

The receiving surface and distribution surface together may form a cup having an opening directed outwardly from the exhaust additive distribution device. Thus, the distribution device will function as a rotary cup atomizer. Since the dosing outlet of the metering device can be positioned within the cup, and since the geometry of the cup can be optimized to prevent back-flow from the cup rim, this solution further reduces the risk of exhaust additive being unintentionally deposited on turbine surfaces.

The exhaust additive distribution device may comprise a radial wall extending from the first end to the second end of the exhaust additive distribution device, wherein the receiving surface is an inner face of the radial wall, and wherein the distribution surface is the surface of an orifice formed in the radial wall, the orifice extending between the inner face of the radial wall and an outer surface of the radial wall. Such a solution resembles current production injector nozzles and thus such a distribution device may be obtained by adjustment of current production lines. The second end of the distribution device may be configured to form a mating surface with an exhaust additive metering device, thus helping to avoid undesired leakage of the exhaust additive.

The fastening surface of the distribution device may be equipped with threads, a flange, or a deformable tail. Thus, a number of means of attaching the distribution device to the shaft or hub of the turbine may be envisioned.

According to another aspect of the present invention, the objects of the present invention are achieved by an airless exhaust additive metering device according to the appended claims. The airless exhaust additive metering device comprises a supply channel, a metering valve and a dosing pipe, wherein the dosing pipe is arranged downstream of the metering valve in the direction of the flow of reductant when dosing. By dosing exhaust additive in the wake of the turbocharger turbine, lower pressure injection may be used. Moreover, because the distribution device disperses the exhaust additive in the exhaust stream, the metering device is not required to do so, and therefore again lower pressures are required. Therefore, an airless metering device may be used, and the metering device has a length of pipe after the metering valve to lead the exhaust additive to the distribution device. Such a solution means that the dosing outlet of the metering device may be positioned in close proximity to the distribution device, thus reducing the risk of misdirected injection and unintended spraying of the turbine with exhaust additive. Moreover, the metering valve may be positioned remotely from the exhaust stream and therefore is not subject to the high temperatures of the exhaust stream. Therefore, there is a lesser requirement for cooling of the metering device as compared to prior art devices.

According to a further aspect of the present invention, the objects of the invention are achieved by an exhaust additive dosing system for a turbocharger turbine of an exhaust system for an internal combustion engine, according to the appended claims.

The exhaust additive dosing system comprises an exhaust additive distribution device, and an exhaust additive metering device. The exhaust additive distribution device of the dosing system comprises a receiving surface, and at least one distribution surface(s); wherein the receiving surface is equipped to receive exhaust additive dosed to the exhaust additive distribution device; and wherein the distribution surface is arranged in fluid communication with the receiving surface and is equipped to distribute exhaust additive in an exhaust stream passing through the turbocharger turbine by the rotary motion of the exhaust additive distribution device. The exhaust additive distribution device is fixedly attached to a shaft or hub of the turbocharger turbine.

The exhaust additive metering device of the dosing system comprises a supply channel, a metering valve, and a dosing pipe arranged downstream of the metering valve in the direction of the flow of reductant when dosing. The exhaust additive metering device is arranged to supply exhaust additive to the receiving surface of the exhaust additive distribution device.

The distribution device may be manufactured integrally with the shaft or hub of the turbocharger turbine. Thus, the number of separate components for manufacture may be reduced and the risk of mechanical separation of the distribution device from the turbine shaft or hub is reduced.

The distribution device may be manufactured separately to the shaft or hub of the turbocharger turbine and fixedly attached to the shaft or hub of the turbocharger turbine by a fastening surface arranged on the distribution device. Thus, turbochargers from OEM's or aftermarket suppliers may readily be adapted.

The exhaust additive metering device of the dosing system may be an airless metering device as described above, i.e. a liquid-only device, or it may be an air-assisted metering device, i.e. utilize compressed air to facilitate the dosing of the exhaust additive to the receiving surface.

The dosing pipe of the exhaust additive metering device may extend through a stopping device arranged centrally in an outlet of the turbocharger turbine. This increases the mechanical integrity of the dosing pipe and provides a degree of thermal insulation to the exhaust additive in the pipe, thus preventing premature thermal degradation of the exhaust additive. The stopping device prevents damage to downstream components of the exhaust system in the event of turbocharger failure.

The exhaust additive dosing system may further comprise a diffusor arranged in an outlet of the turbocharger turbine. The inner surface of the diffusor may optionally be equipped to promote the evaporation of exhaust additive. This may enhance the evaporation and mixing of the exhaust additive. Such an exhaust additive dosing system may further comprise a wastegate gas outlet arranged in a wall of the turbocharger turbine outlet, the wastegate gas outlet being arranged to supply hot exhaust gases to an outer surface of the diffusor. This may further enhance the evaporation and mixing of the exhaust additive.

According to another aspect of the present invention, the objects of the present invention are achieved by a turbocharger comprising an exhaust additive distribution device as disclosed herein.

According to yet a further aspect of the present invention, the objects of the present invention are achieved by a vehicle comprising an exhaust additive dosing system as disclosed herein.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION OF THE INVENTION

Figure 1:
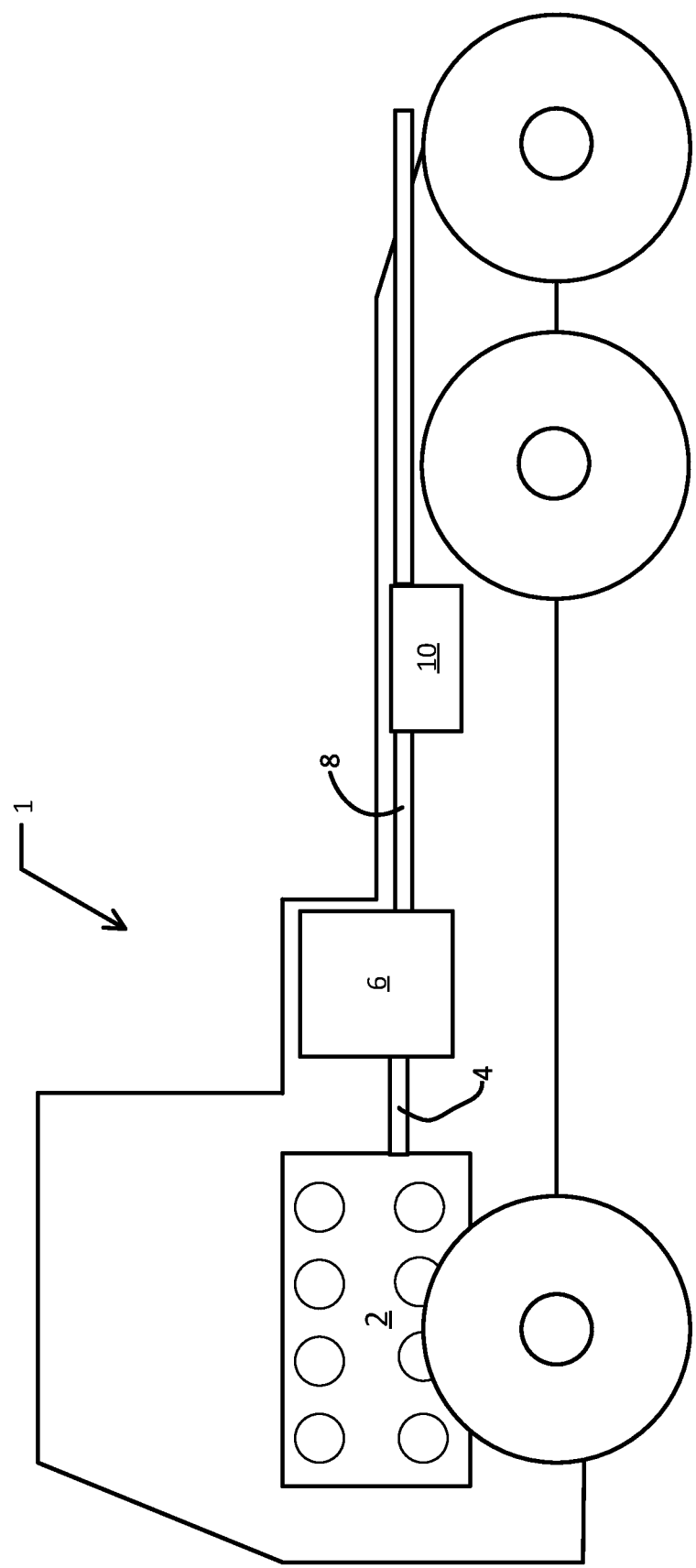
FIG. 1 schematically illustrates a vehicle comprising an exhaust system according to an embodiment of the present invention.

The present invention is based upon the realization by the inventors that the centrifugal force generated by the rotating turbine arrangement of the turbocharger may be used to disperse and distribute exhaust additive in the exhaust stream. A distribution device is affixed centrally to the turbine shaft or hub at the outlet side of the turbine, so that it rotates in conjunction with the turbine. A metering device deposits exhaust additive on the distribution device. The rapid spinning of the distribution device compels the deposited exhaust additive outwards from the axis of rotation of the distribution device along the surface of the distribution device and onwards into the exhaust stream.

Such a solution has a number of advantages. Because the distribution device and outlet of the metering device are located in the wake of the turbine, little force is required to overcome the flow velocity of the exhaust stream at the point of deposition. Therefore, the metering device can operate at lower pressures as compared to prior art solutions, and there is no need for compressed air assistance for injection. The site of additive injection is moved as far up the exhaust system towards the engine as is possible, without risking contamination of the engine lubrication system or requiring extensive integration with third party components. This assists in decomposing urea to ammonia and helps prevent deposits. The already existing energy from the spinning turbine is used to distribute the exhaust additive in the exhaust stream. The energy provided by the spinning turbine helps break up additive droplets when leaving the distribution device and/or when impinging upon walls and other surfaces in the exhaust system. Therefore, there is a reduced need for spray control and the construction of the metering device can therefore be simplified considerably. Moreover, the swirl of the exhaust stream when leaving the turbocharger is controlled by the aerodynamic design of the turbocharger. Therefore, the turbocharger design can be optimized for the best balance of turbocharger performance and mixing of the exhaust additive. Thus, an additional mixer downstream of the additive injection site may be avoided. Since a mixer typically increases backpressure and worsens fuel economy, avoiding a mixer leads to a corresponding improvement in fuel economy.

The additive dosing system of the present disclosure is located in the exhaust system for an internal combustion engine. The internal combustion engine may be any internal combustion engine, but is preferably a four-stroke combustion engine, even more preferably a compression ignition four-stroke combustion engine. The engine may be used in any application commonly known for internal combustion engines. It may for example be merchandized as a free-standing engine, for use for example in power generation or industrial settings. However, application in a vehicle is preferred. By vehicle it is meant any machine utilizing an internal combustion engine to provide motive force, either directly, or indirectly as in the case of series hybrid vehicles. This includes, but is not limited to, motor vehicles such as cars, trucks and buses; railed vehicles such as trains and trams; watercraft such as ships and boats; and aircraft. The exhaust additive is preferably a reductant, even more preferably diesel exhaust fluid comprising a solution of urea in water, in accordance with standard AUS 32 of ISO 22241. However, the exhaust additive may also be another liquid additive added to the exhaust stream, such as hydrocarbon fuel to "burn off" a diesel particulate filter arranged downstream in the exhaust system. However, henceforth the exhaust additive will be referred to simply as "reductant".

The exhaust system is equipped with a turbocharger for recovering energy from the exhaust gases. The turbocharger comprises a turbine housed in a turbine housing. A shaft connects the turbine to the impeller of a compressor for compressing the charge air of the internal combustion engine. This shaft may traverse the turbine, in which case the end of the turbine shaft extends outwardly at the outlet side of the turbine, or the shaft terminate at a hub of the turbine, within the turbine.

The reductant dosing system is located in association with the turbocharger turbine. The dosing system comprises a distribution device and a metering device. The distribution device is mounted on the shaft or hub of the turbocharger, coaxially with the shaft, at the outlet side of the shaft or hub. This means that the distribution device spins in unison with the turbocharger shaft and turbine, around a common rotation axis. The metering device is arranged in conjunction with the distribution device. Its dosing outlet is arranged centrally over the distribution device for depositing reductant to the distribution device. The pipe of the metering device leading to the dosing outlet traverses the wall of the turbine housing or exhaust conduit at an appropriate location downstream of the turbine.

The reductant distribution device comprises a receiving surface, and at least one distribution surface. The distribution device may be an integral part of the turbocharger turbine shaft or hub, i.e. be manufactured integrally with the turbine shaft or hub. Alternatively, the reductant distribution device may comprise a fastening surface by which it may be fixedly attached to the turbine shaft or hub. The distribution device may be constructed from any suitable material, such as steel or aluminium.

The fastening surface, if present, is for fastening the distribution device to the shaft or hub of the turbine. The fastening surface may be an essentially flat surface on the back of the distribution device, or it may be the surface of a pin or shaft protruding from the back of the distribution device. The turbine shaft or hub may be machined to provide a corresponding mating surface for the fastening surface. The fastening interaction between the fastening surface and turbine shaft may be via interlocking threads. The fastening surface and/or turbine shaft may be equipped with a flange for locking the distribution device in place. The fastening surface may have a deformable tail, as for a rivet. This deformable tail may form a locking interaction with the turbine shaft upon deformation. The turbine shaft and fastening surface may be conjoined by welding, soldering, use of an adhesive, or by any other means known in the art. The turbine shaft and distribution device may be integrally constructed, for example by machining the end of the turbine shaft, i.e. the distribution device does not necessarily need to be manufactured separately from the turbine shaft or hub.

The fastening surface is arranged so that any reductant flowing on the receiving and distribution surfaces does not come in contact with the fastening surface. Likewise, the receiving and distribution surfaces are arranged together with the metering device to avoid any reductant coming into contact with the turbine blades and especially the turbine bearings. This is achieved by arranging the fastening surface at a first end of the distribution device and arranging the receiving surface at a second end of the distribution device, opposite the first end. By first end and second end, it is meant the parts of the device that are in proximity to the extremity of the device, but not necessarily at the extremity per se. Thus, for example, a receiving surface extending from a position in proximity to the second extremity of the device to a position in the interior of the device is arranged at the second end of the device. In this manner, contamination of the bearings and lubrication system is avoided.

The distribution device may be disc-shaped and the receiving surface and distribution surface together may together comprise a patterned face of the disc. The pattern may be formed by any known means, such as etching, machining or by an additive process such as deposition or 3D-printing. The pattern may comprise channels extending radially outwards from a centrally located receiving surface. Upon spinning, reductant deposited on the receiving surface is slung outwards along the channels until the edge of the disc is reached, whereby the outer edge acts as a distribution surface spraying reductant outwards towards the wall of the turbine housing, into the surrounding exhaust stream.

The distribution device may be shaped as a cup, for example a bell-cup or conical cup, and function as a rotating cup atomizer. In this case, the dosing outlet of the metering device is arranged centrally within the cup. The reductant is deposited on the base or lower side wall of the cup. The spinning motion of the cup combined with the angle of the cup wall causes the reductant to be forced upwards and outwards from the base of the cup towards the outer rim of the cup, which acts as a distribution surface and disperses reductant into the exhaust stream.

The distribution device may resemble a typical nozzle head having an interior chamber enclosed by a radial side wall. Radially extending orifices are provided through the side wall allowing fluid to escape from the interior chamber to the exterior of the distribution device. The dosing outlet of the metering device is arranged in fluid communication with the interior chamber. Reductant deposited in the interior chamber is pressed against the internal chamber wall by the centrifugal force of the spinning distribution device. Upon encountering an orifice through this wall, the reductant is forced through the orifice, which acts as a distribution surface and distributes reductant radially outwards in a spray into the surrounding exhaust stream.

The reductant metering device of the reductant dosing system may be a liquid-only device, otherwise known as an airless injector. This means that the metering device does not utilize compressed air in order to facilitate injection of the reductant into the exhaust conduit. Since a compressor requires energy to run, this represents an energy saving compared to air-assisted systems. Moreover, some applications such as marine applications do not necessarily have a ready source of compressed air to hand, and thus the use extra, costly components can be avoided. However, the reductant metering device of the reductant dosing system may alternatively be an air-assisted device, i.e. a device that utilizes compressed air to facilitate injection of the reductant. The metering device may be a component of a reductant metering system. Further components of the reductant metering system may include a reductant storage tank, a control unit, and a pressurizing device such as a pump.

Pressurized reductant is supplied to the metering device via a supply channel. The metering device comprises a controllable metering valve for dosing the required amount of reductant to the exhaust system. After passing the metering valve, the reductant is transported along a dosing pipe to a dosing outlet, whereby the reductant is deposited on the distribution device. As previously noted, the metering device is may be liquid-only, i.e. airless. Unlike typical airless injectors, the metering device has a length of dosing pipe arranged after the metering valve in the direction of reductant dosage flow. This means that the metering valve may be located remotely from the exhaust system and thus not be exposed to the high temperatures of the exhaust system, thus potentially increasing the operational life of the injector and reducing the need for a cooling system. As previously noted, because the reductant is dosed in the wake of the turbine, lower reductant pressures are required. Since it is the distribution device and not the dosing outlet of the metering device that disperses the reductant in the exhaust stream, this again means that less kinetic energy is required to be supplied to the reductant and lower reductant pressures may be used. Thus, pumps of simpler, more robust construction may be used in the metering system.

The dosing pipe may traverse the wall of the exhaust system at any suitable location, preferably downstream of the turbine. For example, the dosing pipe may pass through a port provided in the wall of the turbine housing, exhaust conduit, or any exhaust system component located immediately downstream of the turbocharger, such as an exhaust brake.

Since the dosing outlet of the metering device is not required to form an aerosol from the reductant, it can comprise fewer, larger orifices as compared to prior art nozzle heads. For example, it may comprise one or more orifices. This reduces the risk of the orifices being blocked by for example urea deposits. The dosing outlet may have a surface that forms a mating surface with the receiving surface of the distribution device in order to prevent leakage of reductant and assist deposition of reductant to the receiving surface of the distribution device.

A stopping device may be located in the turbine housing. Such a stopping device prevents the turbine from escaping the turbine housing or dismounting the turbine shaft in the event of failure, and may essentially abut the distribution device. If such a stopping device is present, the dosing pipe of the metering device may be pass through or be integrated in the body of the stopping device.

A diffusor may be arranged in the turbine housing. The size, positioning and angle of the diffusor may be varied in order to achieve the desired flow dynamics at the turbine outlet. For example, the diffusor may split the exhaust flow leaving the turbine rotor. The diffusor may comprise or consist of a tube or blades. The inner surface(s) of the diffusor, i.e. those facing the central axis of the turbine housing, may act as evaporation surfaces for reductant droplets being slung from the distribution device. This function may be enhanced by appropriate design of the diffusor by for example coating, etching, machining or choice of material in order to obtain optimal heat conduction. A wastegate outlet arranged in the turbine housing may supply hot exhaust gases bypassing the turbine to the outer surface(s) of the diffusor, i.e. the opposite sides to the inner surfaces. By directing hot wastegate exhaust gases along the outer surfaces of the diffusor, the reductant evaporation functioning of the diffusor is even further enhanced. The diffusor may be partially or fully integrated with the turbine housing.

The present invention will now be further illustrated with reference to the appended figures.

FIG. 1 shows schematically a side view of a vehicle 1 according to an embodiment of the invention. The vehicle 1 includes a combustion engine 2, a first exhaust conduit 4 leading to a turbocharger turbine 6, and a second exhaust conduit 8 leading from the turbocharger turbine 6 to an SCR catalyst 10. A reductant dosing system (not shown) comprising a reductant distribution device and reductant metering device is arranged in conjunction with the turbocharger turbine 6. The vehicle 1 may be a heavy vehicle, e.g. a truck or a bus. The vehicle 1 may alternatively be a passenger car. The vehicle may be a hybrid vehicle comprising an electric machine (not shown) in addition to the combustion engine 2.

Figure 2:
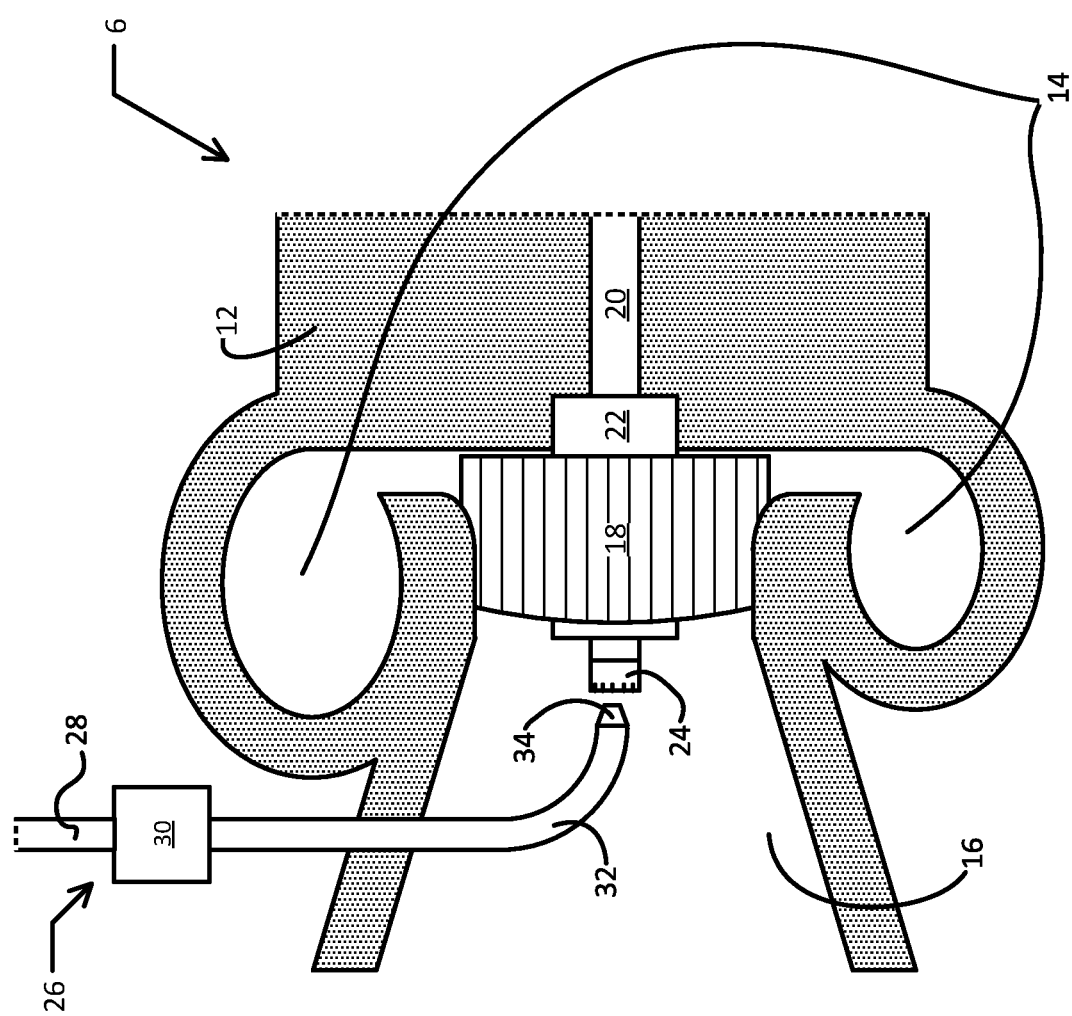
FIG. 2 schematically illustrates an exhaust additive dosing system according to an embodiment of the present invention.

FIG. 2 shows schematically a reductant distribution system according to an embodiment of the present invention. A turbocharger turbine 6 is shown in cross-section, the turbine 6 comprising a turbine housing 12. The turbine housing 12 comprises exhaust gas inlets 14 and exhaust gas outlet 16. Located in the turbine housing 12 is a turbine rotor 18 arranged to rotate on a turbine shaft 20. A sealing member 22 prevents lubricant from leaking out from the turbine bearings (not shown). A reductant distribution device 24 is fixed on the outlet end of the shaft 20. A reductant metering device 26 is arranged in the outlet 16 of the turbine 6. The reductant metering device comprises a supply channel 28, a metering valve 30, a dosing pipe 32 and a dosing outlet 34.

In operation, the distribution device 24 spins in unison with the turbine rotor 18 and shaft 20 whenever exhaust gas passes through the turbine 6. Reductant such as urea solution, upon being deposited to the distribution device 24 from the metering device 26, is dispersed in the exhaust gas passing through the turbine 6 by the spinning motion of the distribution device 24.

Figure 3A:
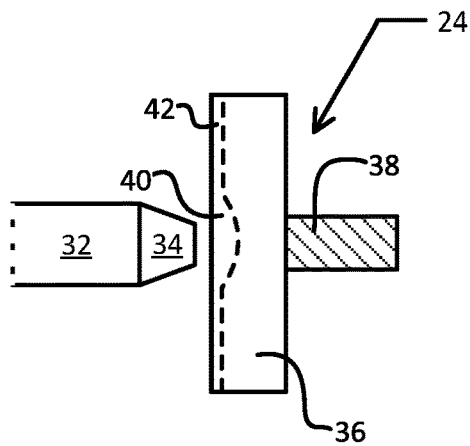
FIG. 3a schematically illustrates a side view of a disc-shaped distribution device.
Figure 3B:
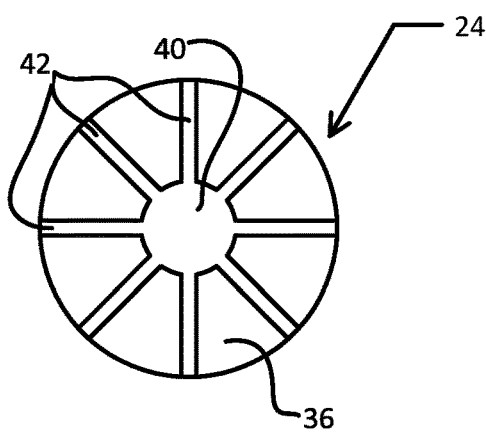
FIG. 3b schematically illustrates a front view of a disc-shaped distribution device.

FIGS. 3a and 3b show schematically a distribution device 24 according to an embodiment of the present invention. FIG. 3a is a side view of the distribution device 24 and FIG. 3b is a front view of the same distribution device 24. In FIG. 3a the position of the dosing outlet 34 relative to the distribution device 24 is illustrated. The distribution device 24 comprises a disc 36 and a fastening shaft 38 affixed to the first end of the disc 36. The cylindrical surface of the fastening shaft 38 is threaded and constitutes a fastening surface for affixing the distribution device 24 to the shaft 20 of the turbine. At the second end of the disc 36, opposite the first end, a pattern has been machined. The pattern comprises of a central well 40 that constitutes a receiving surface for receiving reductant dosed to the distribution device, and channels 42 extending radially from the central well 40 to the outer edge of the disc 36. The portions of the channels 42 at the outer edge of the disc 36 constitute distribution surfaces, wherefrom reductant is distributed into the exhaust stream.

Figure 4A:
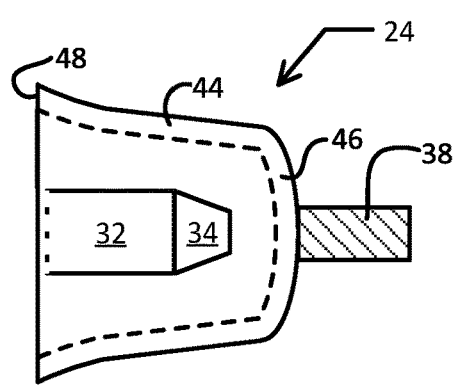
FIG. 4a schematically illustrates a side view of a cup-shaped distribution device.
Figure 4B:
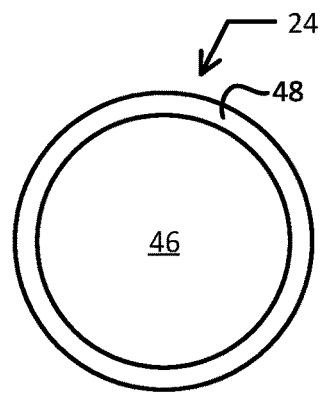
FIG. 4b schematically illustrates a front view of a cup-shaped distribution device.

FIGS. 4a and 4b show schematically a distribution device 24 according to another embodiment of the present invention. FIG. 4a is a side view of the distribution device 24 and FIG. 4b is a front view of the same distribution device. In FIG. 4a the position of the dosing outlet 34 relative to the distribution device 24 is illustrated. The distribution device 24 comprises a bell-cup 44 having a fastening shaft 38 affixed to the outside end of the cup 44. The base 46 of the cup 44 constitutes a receiving surface for receiving dosed reductant from the dosing outlet 34. The dosed reductant is transported along the inner wall of the cup 44 until reaching the rim 48 of the cup which constitutes a distribution surface from which the reductant is dispersed in the exhaust stream.

Figure 5A:
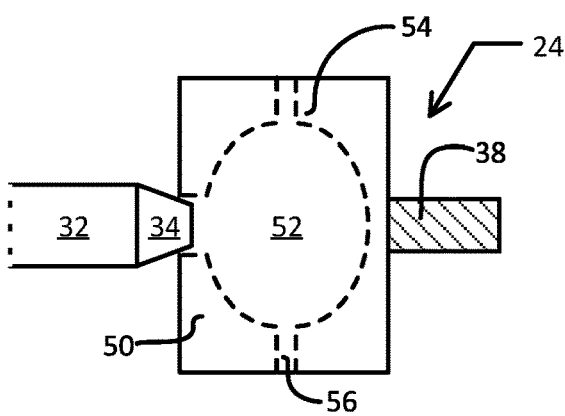
FIG. 5a schematically illustrates a side view of a nozzle-like distribution device.
Figure 5B:
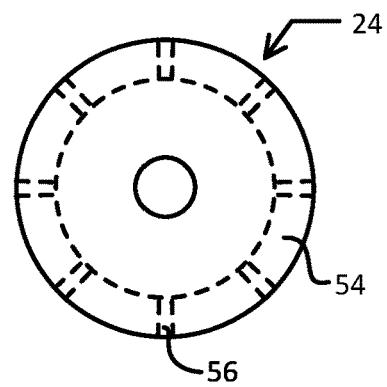
FIG. 5b schematically illustrates a front view of a nozzle-like distribution device.

FIGS. 5a and 5b show schematically a distribution device 24 according to a further embodiment of the present invention. FIG. 5a is a side view of the distribution device 24 and FIG. 5b is a front view of the same distribution device. In FIG. 5a the position of the dosing outlet 34 relative to the distribution device 24 is illustrated. The distribution device 24 comprises a nozzle head 50 having a fastening shaft 38 affixed to the back end. The nozzle head 50 has an inner chamber 52 having a radial side wall 54. Orifices 56 are provided in the radial side walls. The inner face of the radial side wall 54 constitutes a receiving surface and the outer edge of the orifices 56 constitute distribution surfaces.

Figure 6:
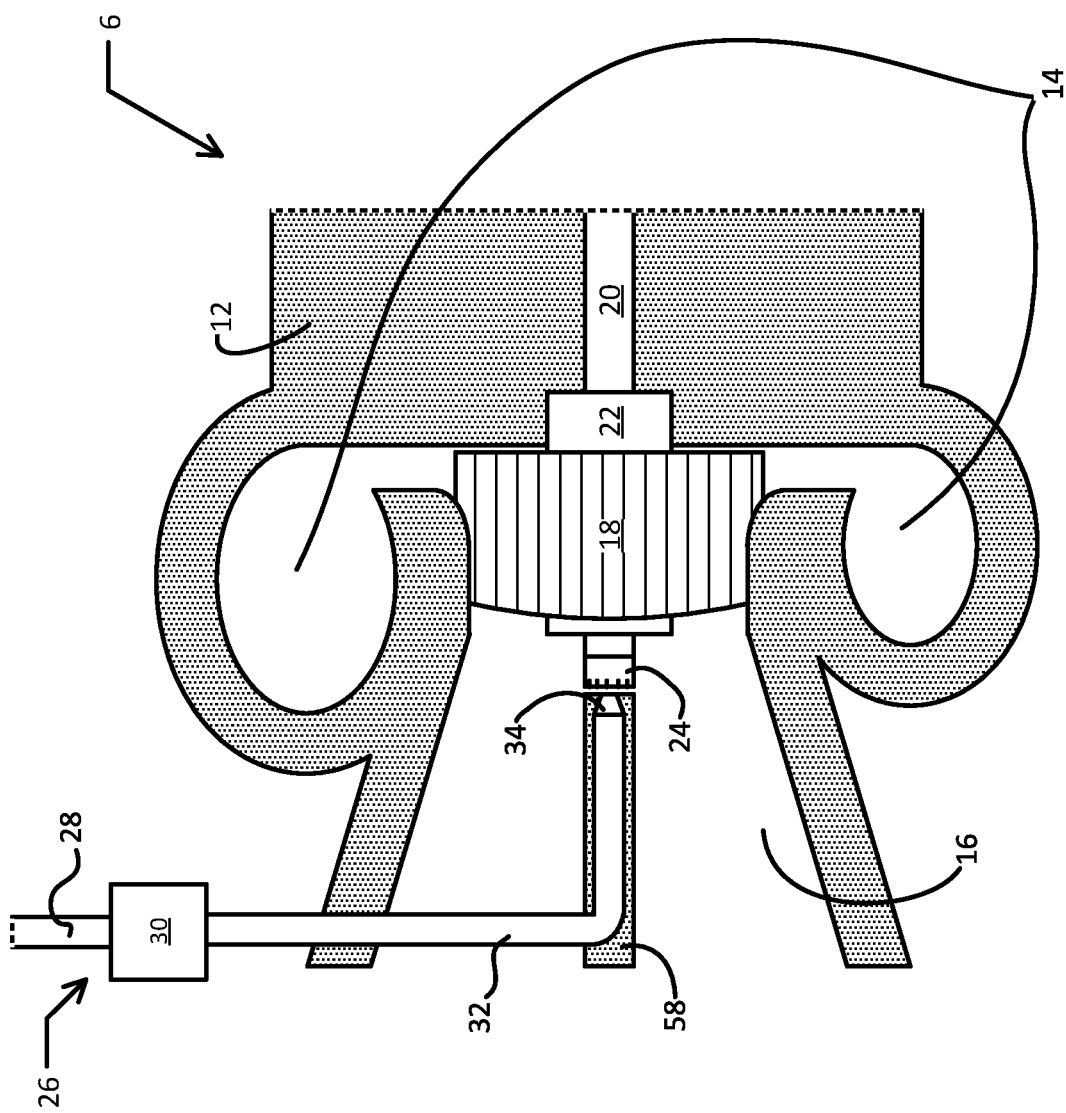
FIG. 6 schematically illustrates an exhaust additive dosing system wherein the metering device is partially integrated in a stopping device.

FIG. 6 shows schematically an embodiment of the present invention wherein the dosing outlet 34 and part of the dosing pipe 32 of the metering device 26 are integrated within a stopping device 58. The stopping device 58 essentially abuts the distribution device 24, thus preventing axial movement of the shaft 20 in the direction of the turbine outlet in the event of failure of the turbocharger. By preventing displacement of the turbine shaft 20, leakage of lubricant is prevented from the turbine bearings (not shown) and components downstream of the turbocharger, such as an exhaust aftertreatment system, are protected from contamination in the event of turbocharger failure. Integration of the metering device 26 with the stopping device 58 provides greater mechanical integrity to the metering device 26.

Figure 7:
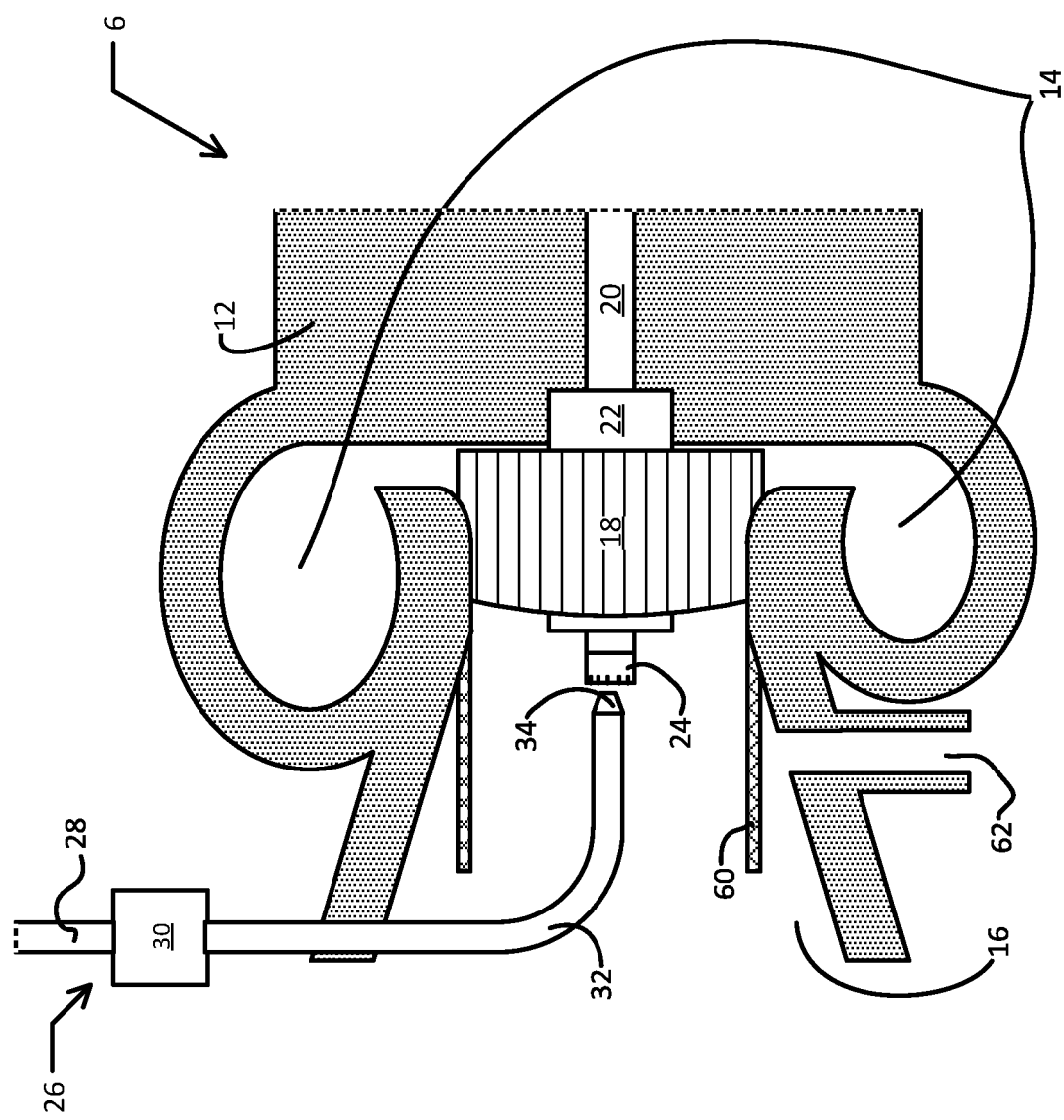
FIG. 7 schematically illustrates an exhaust additive dosing system comprising a diffusor and wastegate outlet.

FIG. 7 shows schematically an embodiment of the present invention wherein a diffusor 60 is located in the turbine outlet. The diffusor 60 serves a dual purpose. It may serve to increase the efficiency of the turbine 6 by providing a smooth transition from dynamic pressure to static pressure for the exhaust gases upon leaving the turbine, as in the case of prior art turbine diffusors. However, it may also function as an evaporation device for reductant droplets deposited on the inner surface (i.e. the surface facing the central axis of the turbine outlet) of the diffusor 60 from the distribution device 24. The functioning of the diffusor 60 as an evaporation device may be optimized in a number of ways. For example, the diffusor may be treated to optimize the contact angle of reductant droplets with the diffusor surface, and/or may be treated to optimize heat transfer to any deposited reductant droplets. The functioning of the diffusor 60 as an evaporation device is further enhanced by the presence of a wastegate outlet 62 in the turbine outlet 16. A wastegate allows hot exhaust gases to bypass the turbocharger turbine rotor 18 under specific conditions, thus preventing excessive rotation of the turbocharger and protecting the engine and turbocharger from damage. The exhaust gases entering the turbine outlet 16 from the wastegate outlet 62 are significantly hotter than gases having passed through the rotor 18. By directing the wastegate gases to the outer surface of the diffusor 60, the diffusor is heated relative to the temperature prevailing at the centre of the turbine outlet, and therefore evaporation of reductant deposited on the diffusor inner surface is facilitated.

The invention claimed is:

1. An exhaust additive distribution device for a turbocharger turbine of an exhaust system for an internal combustion engine, the exhaust additive distribution device comprising:
a fastening surface;
a receiving surface; and
at least one distribution surface,
wherein the fastening surface is configured to fixedly attach the exhaust additive distribution device upstream of a rotor of the turbocharger turbine, to a shaft or a hub of the turbocharger turbine,
wherein the receiving surface comprises a concave wall configured to receive exhaust additive dosed to the exhaust additive distribution device, and
wherein the at least one distribution surface is arranged upstream of, in a direction of flow of the exhaust additive, and in fluid communication with the receiving surface, wherein the at least one distribution surface is configured to distribute the exhaust additive in an exhaust stream passing through the turbocharger turbine by a rotary motion of the exhaust additive distribution device.

2. The exhaust additive distribution device according to claim 1, wherein the receiving surface and the at least one distribution surface together form a patterned facial surface.

3. The exhaust additive distribution device according to claim 1, wherein the receiving surface and the at least one distribution surface together form a cup having an opening directed outwardly from the exhaust additive distribution device.

4. The exhaust additive distribution device according to claim 1, wherein the exhaust additive distribution device further comprises a radial wall extending from the receiving surface, wherein the receiving surface is an inner face of the radial wall, and wherein the at least one distribution surface is the surface of an orifice formed in the radial wall, the orifice extending between the inner face of the radial wall and an outer surface of the radial wall.

5. The exhaust additive distribution device according to claim 4 wherein the distribution device is configured to form a mating surface with an exhaust additive metering device.

6. The exhaust additive distribution device according to claim 1, wherein the fastening surface is configured with one of: threads, a flange, or a deformable tail.

7. An exhaust additive dosing system for a turbocharger turbine of an exhaust system for an internal combustion engine, the exhaust additive dosing system comprising:
an exhaust additive distribution device; and
an exhaust additive metering device,
wherein the exhaust additive distribution device comprises a receiving surface and at least one distribution surface, wherein the receiving surface comprises a concave wall configured to receive exhaust additive dosed to the exhaust additive distribution device, wherein the at least one distribution surface is arranged upstream of, in a direction of flow of the exhaust additive, and in fluid communication with the receiving surface, wherein the at least one distribution surface is configured to distribute the exhaust additive in an exhaust stream passing through the turbocharger turbine by a rotary motion of the exhaust additive distribution device,
wherein the exhaust additive distribution device is fixedly attached upstream of a rotor of the turbocharger turbine, to a shaft or a hub of the turbocharger turbine,
wherein the exhaust additive metering device comprises: a supply channel; a metering valve; and a dosing pipe arranged downstream of the metering valve in a direction of a flow of reductant when dosing, and wherein the exhaust additive metering device is arranged to supply exhaust additive to the receiving surface of the exhaust additive distribution device.

8. The exhaust additive dosing system according to claim 7 wherein the distribution device is manufactured integrally with the shaft or the hub of the turbocharger turbine.

9. The exhaust additive dosing system according to claim 7 wherein the distribution device is manufactured separately to the shaft or the hub of the turbocharger turbine and is fixedly attached to the shaft or the hub of the turbocharger turbine by a fastening surface arranged on the distribution device.

10. The exhaust additive dosing system according to claim 7, wherein the dosing pipe of the exhaust additive metering device extends through a stopping device arranged centrally in an outlet of the turbocharger turbine.

11. The exhaust additive dosing system according to claim 7, further comprising a diffusor arranged in an outlet of the turbocharger turbine, wherein an inner surface of the diffusor is configured to promote an evaporation of the exhaust additive.

12. The exhaust additive dosing system according to claim 11, further comprising a wastegate gas outlet arranged in a wall of the turbocharger turbine outlet, the wastegate gas outlet being arranged to supply hot exhaust gases to an outer surface of the diffusor.

13. A turbocharger, comprising an exhaust additive distribution device for a turbocharger turbine of an exhaust system for an internal combustion engine, the exhaust additive distribution device comprising:
a fastening surface;
a receiving surface; and
at least one distribution surface,
wherein the fastening surface is configured to fixedly attach the exhaust additive distribution device upstream of a rotor of the turbocharger turbine, to a shaft or a hub of the turbocharger turbine,
wherein the receiving surface comprises a concave wall configured to receive exhaust additive dosed to the exhaust additive distribution device, and
wherein the at least one distribution surface is arranged upstream of, in a direction of flow of the exhaust additive, and in fluid communication with the receiving surface, wherein the distribution surface is configured to distribute the exhaust additive in an exhaust stream passing through the turbocharger turbine by a rotary motion of the exhaust additive distribution device.

14. The exhaust additive distribution device according to claim 13, wherein the receiving surface and the at least one distribution surface together form a patterned facial surface.

15. The exhaust additive distribution device according to claim 13, wherein the receiving surface and the at least one distribution surface together form a cup having an opening directed outwardly from the exhaust additive distribution device.

16. The exhaust additive distribution device according to claim 13, wherein the exhaust additive distribution device further comprises a radial wall extending from the receiving surface, wherein the receiving surface is an inner face of the radial wall, and wherein the at least one distribution surface is the surface of an orifice formed in the radial wall, the orifice extending between the inner face of the radial wall and an outer surface of the radial wall.

17. A vehicle comprising an exhaust additive dosing system for a turbocharger turbine of an exhaust system for an internal combustion engine, the exhaust additive dosing system comprising:
an exhaust additive distribution device; and
an exhaust additive metering device,
wherein the exhaust additive distribution device comprises a receiving surface and at least one distribution surface, wherein the receiving surface comprises a concave wall configured to receive exhaust additive dosed to the exhaust additive distribution device, wherein the at least one distribution surface is arranged upstream of, in a direction of flow of the exhaust additive, and in fluid communication with the receiving surface, wherein the at least one distribution surface is configured to distribute the exhaust additive in an exhaust stream passing through the turbocharger turbine by a rotary motion of the exhaust additive distribution device,
wherein the exhaust additive distribution device is fixedly attached upstream of a rotor of the turbocharger turbine, to a shaft or a hub of the turbocharger turbine,
wherein the exhaust additive metering device comprises: a supply channel; a metering valve; and a dosing pipe arranged downstream of the metering valve in a direction of a flow of reductant when dosing, and
wherein the exhaust additive metering device is arranged to supply exhaust additive to the receiving surface of the exhaust additive distribution device.

18. The vehicle according to claim 17 wherein the distribution device is manufactured integrally with the shaft or the hub of the turbocharger turbine.

19. The vehicle according to claim 17 wherein the distribution device is manufactured separately to the shaft or the hub of the turbocharger turbine and is fixedly attached to the shaft or hub of the turbocharger turbine by a fastening surface arranged on the distribution device.

* * * * *